Oct. 15, 1940.   W. T. BARRANS   2,217,832
BRAID COVERED ELECTRIC CORD AND METHOD OF MAKING SUCH A CORD
Filed March 3, 1939
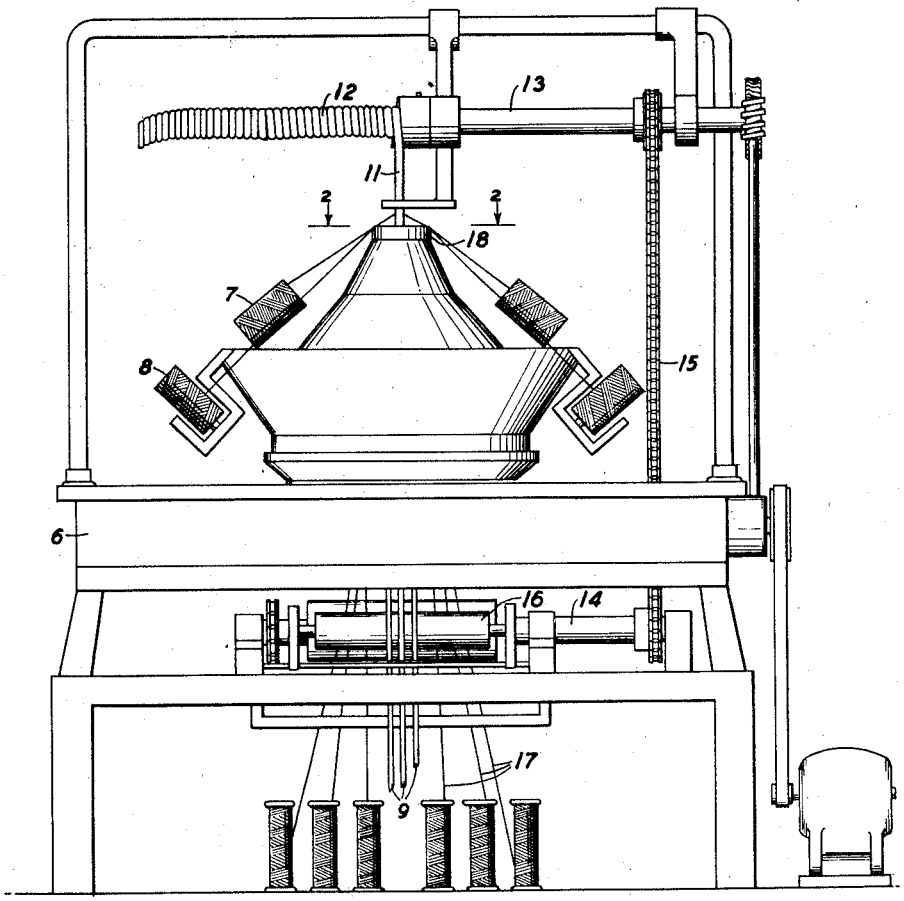
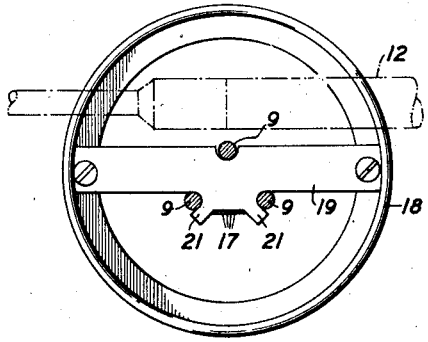
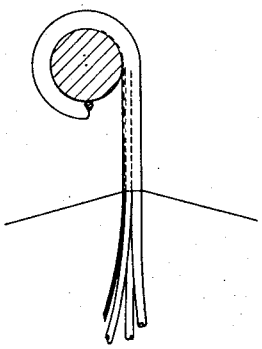
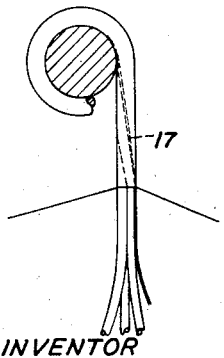
INVENTOR
W. T. BARRANS
BY
ATTORNEY Patented Oct. 15, 1940

2,217,832

UNITED STATES PATENT OFFICE 2,217,832

BRAID COVERED ELECTRIC CORD AND METHOD OF MAKING SUCH A CORD

William T. Barrans, Towson, Md., assignor to Western Electric Company, Incorporated, New York, N. Y., a corporation of New York Application March 3, 1939, Serial No. 259,507

12 Claims. (Cl. 96—26)

This invention relates to a braid covered electric cord and method of making such a cord and more particularly to a coiled extensible and retractile cord and method of making such a cord.

Objects of the invention are to provide a cord and method of making a cord having a high retractility.

In accordance with one embodiment of the invention a covering of braided strands is applied to a helically coiled retractile electric cord and the strands passing spirally around the cord in one direction have a higher tension applied thereto than the strands passing spirally around the cord in the opposite direction to increase the tendency of the cord to retract when extended.

A complete understanding of the invention may be had by reference to the following description taken in conjunction with the accompanying drawing, in which Fig. 1 is a front elevation of a machine by means of which the invention may be practiced;

Fig. 2 is a plan view taken on line 2—2 of Fig. 1;

Fig. 3 is a detail view of a portion of a cord being made by the process of this invention, and Fig. 4 is a view similar to that of Fig. 3 showing a step in a modified process.

A cord made in accordance with and by the process of this invention may be made on a Wardwell type of braider such as shown in Fig. 1. The details of this machine are more fully disclosed in the patent to Miller, No. 1,602,442, of October 12, 1926, and only such features or modifications as are necessary to practice the present invention will be disclosed herein.

Referring to Fig. 1, a frame 6 is shown having a braider head which carries a series of cops 7 of yarn, or other suitable braiding material, rotating in a counterclockwise direction and a second series of cops 8 which rotate in a clockwise direction as viewed from above. The braiding is applied to a group of three conductors 9, forming a cord 11, which is drawn through the machine by a rotating axial delivery capstan 12. The capstan is rotated by a shaft 13 connected to a shaft 14 through a chain 15. The shaft 14 drives a pair of tension rolls 16, which feed elastic members 17 into the cord. The speed of the shafts 13 and 14 are so correlated as to produce a tension of approximately 180% in the elastic members 17. The elastic members underlie the braid and are fed as a group to one side of the conductor and the braid is applied to a straight portion of the cord 11 between the upper end 18 of the braiding head and the capstan. The tension in the elastic members gives the cord a tendency to form a helical coil. In forming a helical coil it is evident that there is a tendency for the braid in the outer portion of a convolution to be stretched and for the braid on the inner portion of a convolution to be compressed. In addition to this there is a twisting action on the braid as the coil forms a helix. This twisting action causes the successive convolutions of the coil to lie closely together. This latter tendency may be considerably enhanced by either applying a twist to the cord as the braiding is applied or by applying a different tension to the yarns of one series of cops than is applied to the other.

In accordance with the first method the elastic elements are applied to the cord 180° from the capstan and the cord is rotated 180° between the point of application of the braid and the capstan. In this connection it may be noted that the elastic elements will of their own accord orientate themselves so as to lie adjacent the capstan when they reach the capstan. Referring, for instance, to Fig. 2 showing a plan view of the upper stationary portion 18 of the braider head, this portion of the head is provided with a cross-piece 19 having triangularly spaced guides for the conductors 9 of the cord and the elastic elements 17 are guided between two projections 21 on the cross-piece. In this figure the elastic elements 17 are shown rotated 180° from the portion of the cord when it reaches the capstan. When a coil is made having a right-hand pitch the cord is twisted between the guides and the capstan so that the elastic elements will be revolved clockwise 180°, as viewed from above in Fig. 4, when the cord reaches the capstan. Once the twist in the cord is started this way it will continue to twist in the same direction. When it is desired to make a cord with a left-hand pitch the twist in the cord would be started in the opposite direction. This rotation or twist in the cord between the point of application of the braid and the capstan results in the strands from the cops 8 being incorporated in the braid in shorter length than the strands from the cops 7 in a right hand pitch cord and increases the tendency for the cord to retract, or in other words, for the convolutions to come closely together after the cord has been stretched.

A similar result may be obtained by feeding the elastic elements to the cord on the side adjacent the capstan and applying a different tension to the two series of yarns. For this purpose the cross-piece 19 would be rotated 180° from the position shown in Fig. 2, and for making a retractile cord of right hand pitch a tension of four ounces would be applied to the yarns from the series of cops 7 rotating in a counterclockwise direction, and a tension of eight ounces would be applied to the yarns from the series of cops 8 rotating in a clockwise direction as viewed from above in Fig. 1. In this manner the yarns from the cops 8 will be incorporated in the braid in shorter lengths than the yarns from the cops 7. For a cord of left hand pitch the tensions would of course be reversed. An extensible retractile cord made in this manner has a much higher tendency to resume a closely coiled helical form than a cord in which the braid is untwisted or equally tensioned.

It will be understood that the tensions and other specific features disclosed are merely illustrative and that many changes and modifications may be made therein without departing from the spirit and scope of the invention.

What is claimed is:

1. A method of making a braided cord which comprises imparting a higher tension to the braid strands going in one direction around the cord than to the braid strands going in the other direction to incorporate the differently tensioned strands in the braid in different lengths.

2. A method of making a braided helically coiled cord which comprises unequally tensioning the strands of the braid so as to cause a tendency for the cord to assume a closely coiled form.

3. A method of making a braided cord which comprises applying a covering of braided strands to the cord, taking up the cord on a cylindrical take-up member, and causing the cord to twist between the point of application of the braid and the take-up device to apply unequal tensions to the braided strands.

4. A method of making a braided cord which comprises applying a covering of braided strands to the cord, incorporating an elastic element in one side of the cord, taking up the braided cord, and causing the cord to twist between the braiding point and the take-up point.

5. A method of making a braided cord which comprises applying braided oppositely spiralled strands to the cord, and tensioning the strands going in one direction to a greater degree than the strands going in the other direction to provide an unbalanced tension in the strands.

6. A method of making a braided cord which comprises applying braided oppositely spiralled strands to the cord, tensioning the strands going in one direction to a greater degree than the strands going in the other direction, and incorporating an elastic element in one side of the cord.

7. A retractile cord having a covering of sets of braided strands the different sets being unequally tensioned to cause the cord to coil closely.

8. A retractile cord having an elastic element incorporated in one side thereof tending to cause the cord to coil and a covering of sets of braided strands the different sets being unequally tensioned to increase its tendency to retract.

9. A helically coiled retractile cord comprising a flexible conductor, and a covering of braided strands passing spirally in opposite directions around said conductor, the strands going in one direction being of greater length than the strands going in the other direction.

10. A helically coiled retractile cord comprising a flexible conductor, a covering of braided strands passing spirally in opposite directions around said conductor; the strands going in one direction having a higher tension applied thereto than the strands going in the other direction to increase its retractility, and an elastic element incorporated in one side of the cord to cause it to coil.

11. A helically coiled cord comprising a flexible conductor covered with strand material passing around the cord in opposite directions, the tension in the strands going in one direction being unbalanced with respect to the tension in the strands going in the opposite direction to aid in retracting the cord when extended.

12. A helically coiled cord comprising a flexible conductor covered with strand material in which the tension in the strands is unbalanced to aid in retracting the cord when extended, and a flexible element incorporated in one side of the cord.

WILLIAM T. BARRANS.